(12) United States Patent
Kanazashi (10) Patent No.: US 7,173,994 B2
(45) Date of Patent: Feb. 6, 2007

(54) TIMING RECOVERY CIRCUIT WITH MULTIPLE STAGES

(75) Inventor: Kazuyuki Kanazashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/357,031

(22) Filed: Feb. 21, 2006

(65) Prior Publication Data

US 2006/0214825 A1    Sep. 28, 2006

(30) Foreign Application Priority Data

Mar. 28, 2005    (JP)    ............... 2005-093004

(51) Int. Cl.
*H04L 3/24* (2006.01)
(52) U.S. Cl. .................. 375/355; 375/376; 375/375; 375/354
(58) Field of Classification Search ............... 375/355, 375/356, 375, 376, 373; 331/17; 327/141, 327/144, 146, 147
See application file for complete search history.

(56) References Cited

U.S. PATENT DOCUMENTS

| | | | | |
|---|---|---|---|---|
| 4,896,334 | A * | 1/1990 | Sayar | 375/293 |
| 6,314,145 | B1 * | 11/2001 | van Driest | 375/326 |
| 6,363,129 | B1 * | 3/2002 | Agazzi | 375/355 |
| 6,414,990 | B1 * | 7/2002 | Jonsson et al. | 375/232 |
| 6,563,897 | B1 | 5/2003 | Kitta | |
| 6,583,822 | B1 * | 6/2003 | Jun | 348/537 |
| 6,636,120 | B2 * | 10/2003 | Bhakta et al. | 331/17 |
| 6,765,445 | B2 * | 7/2004 | Perrott et al. | 331/17 |
| 6,819,514 | B1 * | 11/2004 | Behrens et al. | 360/65 |
| 6,901,126 | B1 * | 5/2005 | Gu | 375/355 |
| 6,985,549 | B1 * | 1/2006 | Biracree et al. | 375/355 |
| 6,996,193 | B2 * | 2/2006 | Yamagata et al. | 375/329 |
| 7,116,742 | B2 * | 10/2006 | Agazzi | 375/355 |

FOREIGN PATENT DOCUMENTS

JP    2000-101659    4/2000

* cited by examiner

*Primary Examiner*—Linh Nguyen
(74) *Attorney, Agent, or Firm*—Arent Fox, PLLC (57) ABSTRACT

A timing recovery circuit includes a first oscillating circuit configured to produce a first timing signal, a second oscillating circuit configured to produce a second timing signal, a first decimation circuit coupled to a supply node of a first clock signal and to the first oscillating circuit to produce a second clock signal made by decimating pulses of the first clock signal in response to the first timing signal, and a second decimation circuit coupled to the first decimation circuit and to the second oscillating circuit to produce a third clock signal made by decimating pulses of the second clock signal in response to the second timing signal, wherein one of the first timing signal and the second timing signal has a fixed cycle, and another one has a cycle responsive to feedback control.

10 Claims, 8 Drawing Sheets

TIMING RECOVERY CIRCUIT WITH MULTIPLE STAGES

CROSS-REFERENCE TO RELATED APPLICATIONS

The present application is based upon and claims the benefit of priority from the prior Japanese Patent Application No. 2005-093004 filed on Mar. 28, 2005, with the Japanese Patent Office, the entire contents of which are incorporated herein by reference.

BACKGROUND OF THE INVENTION

1. Field of the Invention

The present invention generally relates to receiver circuits that synchronize the receiver side with the transmitter side, and particularly relates to a symbol timing recovery circuit that recovers the symbol timing on the receiver side.

2. Description of the Related Art

In high-speed serial communications, provision is made to avoid the transmission of a clock signal as a separate signal from communication data, thereby reducing the number of communication lines. On the data receiving side, the communication data transmitted from the transmitter side need to be properly received. To this end, a symbol timing recovery circuit is employed, for example, to control the phase of the received signal for synchronization with the clock on the data receiving side.

Figure 1:
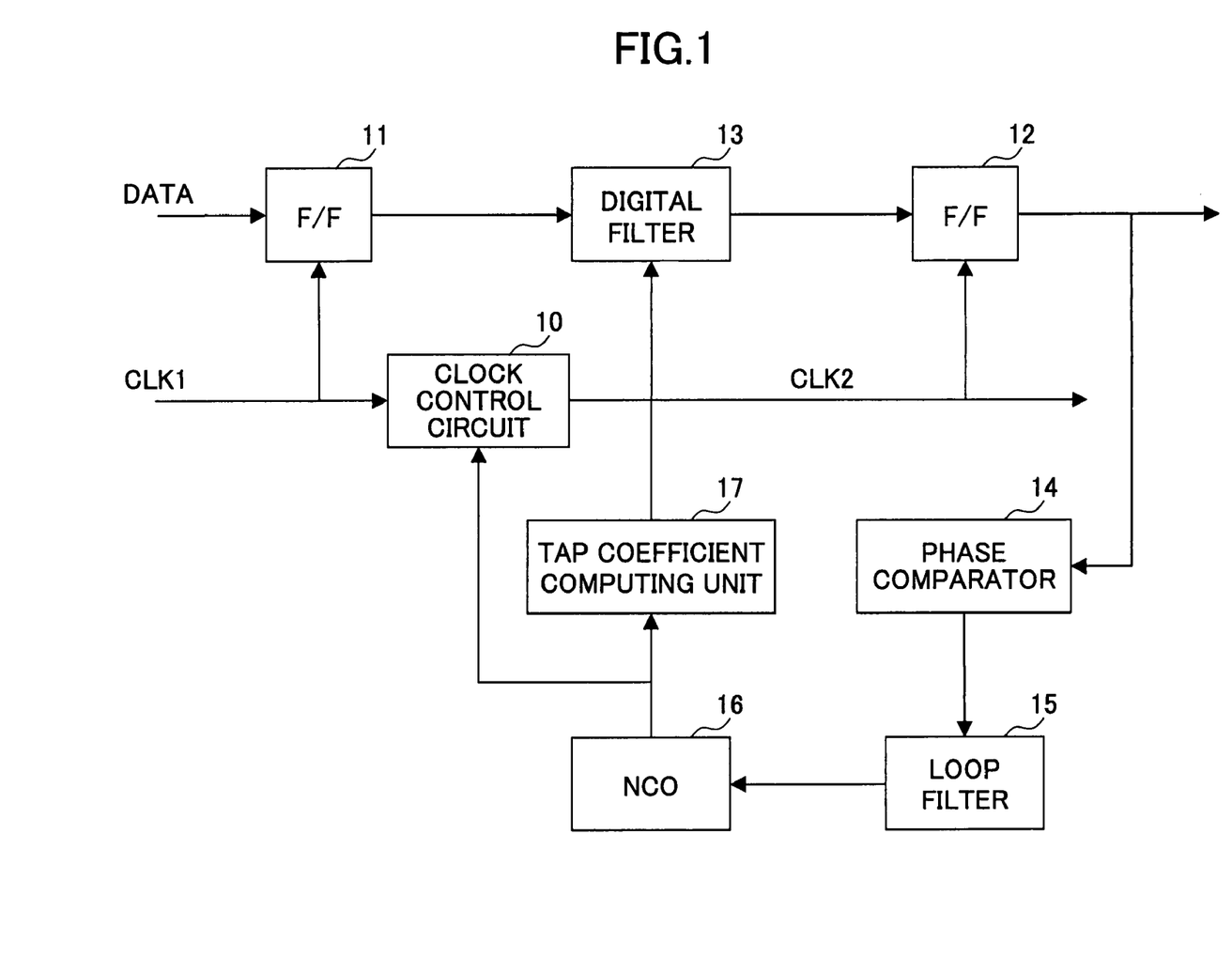
FIG. 1 is a drawing showing an example of the configuration of a related-art symbol timing recovery circuit.

FIG. 1 is a drawing showing an example of the configuration of a related-art symbol timing recovery circuit. This symbol timing recovery circuit is disclosed in Japanese Patent Application Publication No. 2000-101659. The symbol timing recovery circuit of FIG. 1 includes a clock control circuit 10, flip-flops (F/F) 11 and 12, a digital filter 13, a phase comparator 14, a loop filter 15, an NCO (numerical controlled oscillator) 16, and a tap coefficient computing unit 17.

The flip-flop 11 receives data DATA, which is sampled at such sufficiently high frequency that all the signal frequency components of the received signal are below the Nyquist frequency. The flip-flop 11 latches the received data DATA by use of a clock signal CLK1, and outputs the latched data. The clock signal CLK1 has a frequency more than twice as high as the symbol rate of the received data DATA. Accordingly, the output of the flip-flop 11 is equivalent to received data that is made by sampling the received signal at the frequency of the clock signal CLK1.

The digital filter 13 delays the output of the flip-flop 11 in response to the tap coefficients provided therein, thereby generating delayed received data. The flip-flop 12 latches the delayed received data by use of a clock signal CLK2, and outputs the latched data. The clock signal CLK2 is obtained by decimating the clock pulses of the clock signal CLK1 by use of the clock control circuit 10. Here, the control is such that the frequency after the decimation is equal to twice the symbol rate of the received data DATA. The symbol rate of the received data DATA may be 18 MHz, and the frequency of the clock signal CLK1 may be 48 MHz, for example. In this case, the clock control circuit 10 decimates (discards) one in every four clock pulses of the clock signal CLK1, thereby generating the 36-MHz clock signal CLK2. With this provision, the received data that is sampled at twice the symbol rate (18 MHz×2=36 MHz) is obtained. Such received data is comprised of the data identifying points and zero-crossing points of the received signal appearing alternately.

In the operation described above, the clock decimation by the clock control circuit 10 serves to match the clock frequency on the receiver side with the symbol rate of the received signal. Further, the delay imposed by the digital filter 13 serves to adjust the phase of the received signal for synchronization with the clock signal on the receiver side. In such delaying, specifically, a filtering process is performed by use of the coefficients responsive to the timing difference between the actual sample points and the data identifying points or zero-crossing points. As a result, the samples (i.e., outputs of the flip-flop 11) that are taken at the timing deviating from the data identifying points or zero-crossing points are interpolated to remove a phase displacement (timing displacement), thereby computing values sampled at the data identifying points or zero-crossing points.

The decimation by the clock control circuit 10 and the filtering process by the digital filter 13 are controlled based on the feedback control using the output of the flip-flop 12. This feedback control is performed such that the output of the flip-flop 12 resulting from the filtering process by the digital filter 13 coincide with the data identifying points or zero-crossing points. Specifically, the phase comparator 14 uses, among the output data of the flip-flop 12, the value of the data supposed to be at a zero-crossing point and the values of the data supposed to be at the preceding and following data identifying points, and computes a deviation from the conditions that are supposed to be satisfied by the values of the zero-crossing points and the values of the data identifying points. This computed value represents a phase difference between the output of the flip-flop 12 and the zero-crossing points or data identifying points.

The value indicative of a phase difference that is output from the phase comparator 14 is integrated by the loop filter 15. The NCO 16 oscillates at the frequency responsive to the value indicated by the output of the loop filter 15. For example, the larger the output of the loop filter 15, the higher the oscillating frequency of the NCO 16 is. The smaller the output of the loop filter 15, the lower the oscillating frequency of the NCO 16 is. The oscillating signal of the NCO 16 has a sawtooth waveform. In response to the signal value of this sawtooth waveform, the tap coefficient computing unit 17 computes filter coefficients for provision to the digital filter 13.

When there is a difference between the frequency of the clock signal CLK1 and twice the frequency of the symbol rate, a timing difference between the sample points of the output of the flip-flop 11 and the data identifying points or zero-crossing points gradually increases, and then gradually decreases. Such timing difference gradually increases again, and then gradually decreases. Such actions are repeated. Here, changes in the value of the sawtooth waveform match these changes in the timing difference. The process performed by the digital filter 13 cancels out this timing difference.

When there is a difference between the frequency of the clock signal CLK1 and twice the frequency of the symbol rate, there is a need to downsample the number of samples of the output of the flip-flop 11 since the number of these samples is larger than the number of the data identifying points and the zero-crossing points. Such a need arises even through the digital filter 13 cancels out the timing difference. The clock control circuit 10 decimates the clock pulses at the timing corresponding to a falling edge of the sawtooth waveform output from the NCO 16, thereby achieving a desired decimation.

Figure 2:
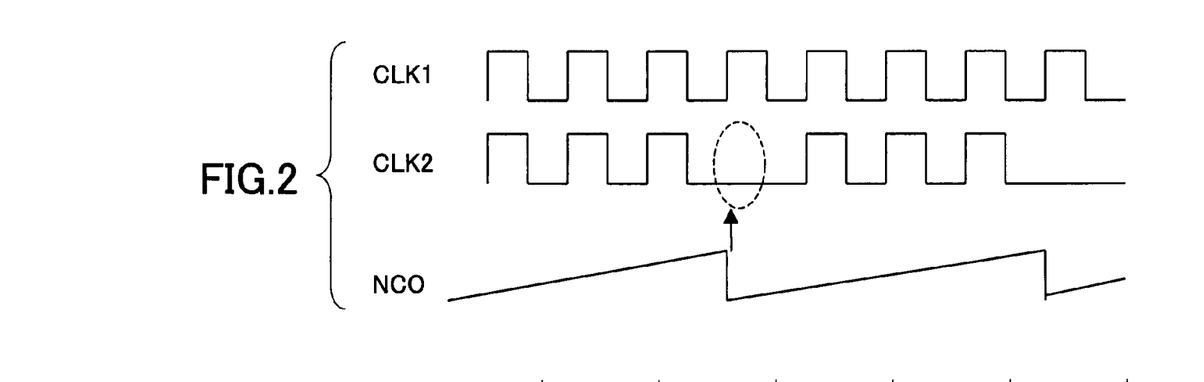
FIG. 2 is a drawing for explaining the decimation of a clock signal by a clock control circuit.

FIG. 2 is a drawing for explaining the decimation of the clock signal by the clock control circuit 10. As shown in FIG. 2, one of the clock pulses of the clock signal CLK1 is decimated at the timing corresponding to a falling edge of the sawtooth signal output from the NCO 16, thereby generating the clock signal CLK2.

In the symbol timing recovery circuit as shown in FIG. 1, the operating performance extremely drops when the rate of clock pulse decimation is a reciprocal of an integer number such as ½ (decimation of one in every two) or ⅓ (decimation of one in every three).

Figure 3:
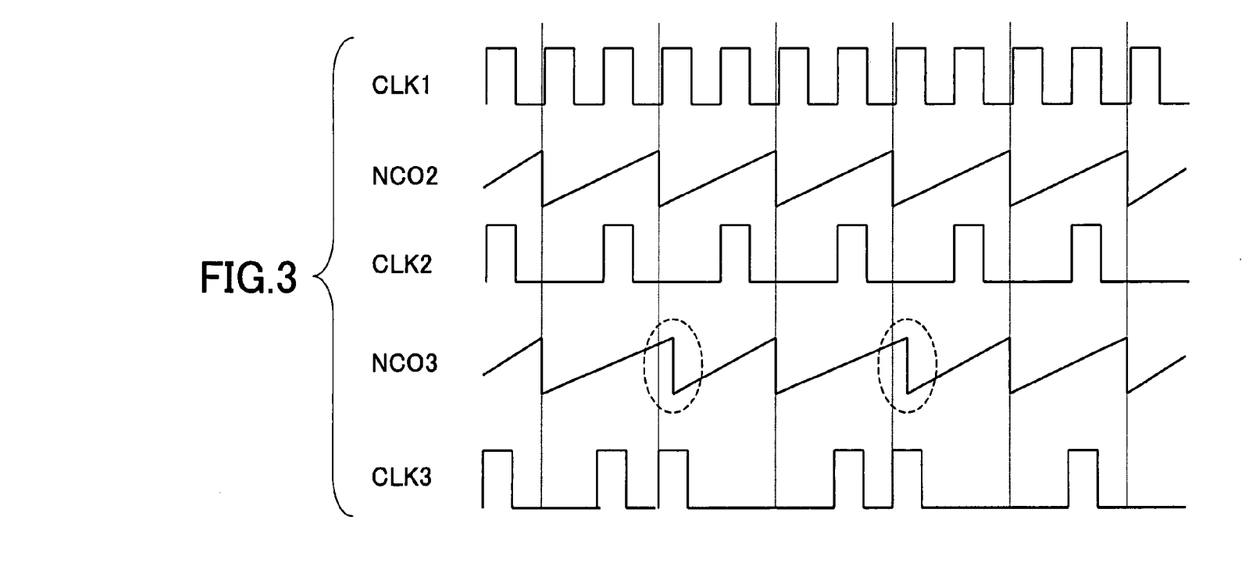
FIG. 3 is a drawing for explaining the problem associated with the decimation of a clock signal at a rate of ½.

FIG. 3 is a drawing for explaining the problem associated with the decimation of the clock signal CLK1 at a rate of ½. When the clock signal CLK1 is decimated at a rate of ½ under ideal conditions, clock pulses are discarded at the timing corresponding to the falling edges of a sawtooth waveform shown as NCO2 having half the cycle of the clock signal CLK1. Consequently, a signal like the clock signal CLK2 having clock pulses evenly distributed is obtained after the balanced decimation of clock pulses. In actual circuitry, however, the falling edges of the output signal of the NCO 16 may have fluctuating timing due to the effect of jitter from the loop filter 15 to the NCO 16 shown in FIG. 1, for example. In such a case, a signal waveform as shown as NCO3 is obtained. When the clock pulses are decimated at the timing corresponding to the falling edges of such sawtooth signal (a clock pulse immediately following each falling edge is decimated), the resulting waveform will be like a clock signal CLK3 illustrated at the bottom.

The clock signal CLK3 has the desired decimation ratio (decimation rate) that is equal to ½. However, the distribution of clock pulses is extremely uneven. The intended operation is to perform a latch operation of the flip-flop 12 of FIG. 1 by use of a clock signal such as the clock signal CLK2 shown in FIG. 3, thereby generating data in which the values of data identifying points and the values of zero-crossing points appear alternately. In actuality, however, an irregular clock signal such as the clock signal CLK3 shown in FIG. 3 is used to perform a latch operation of the flip-flop 12 shown in FIG. 1. This cannot achieve such proper decimation that the values of data identifying points and the values of zero-crossing points are properly left. As a result, the recovery of the received signal becomes inaccurate, causing degradation in the signal reception performance.

Figure 4:
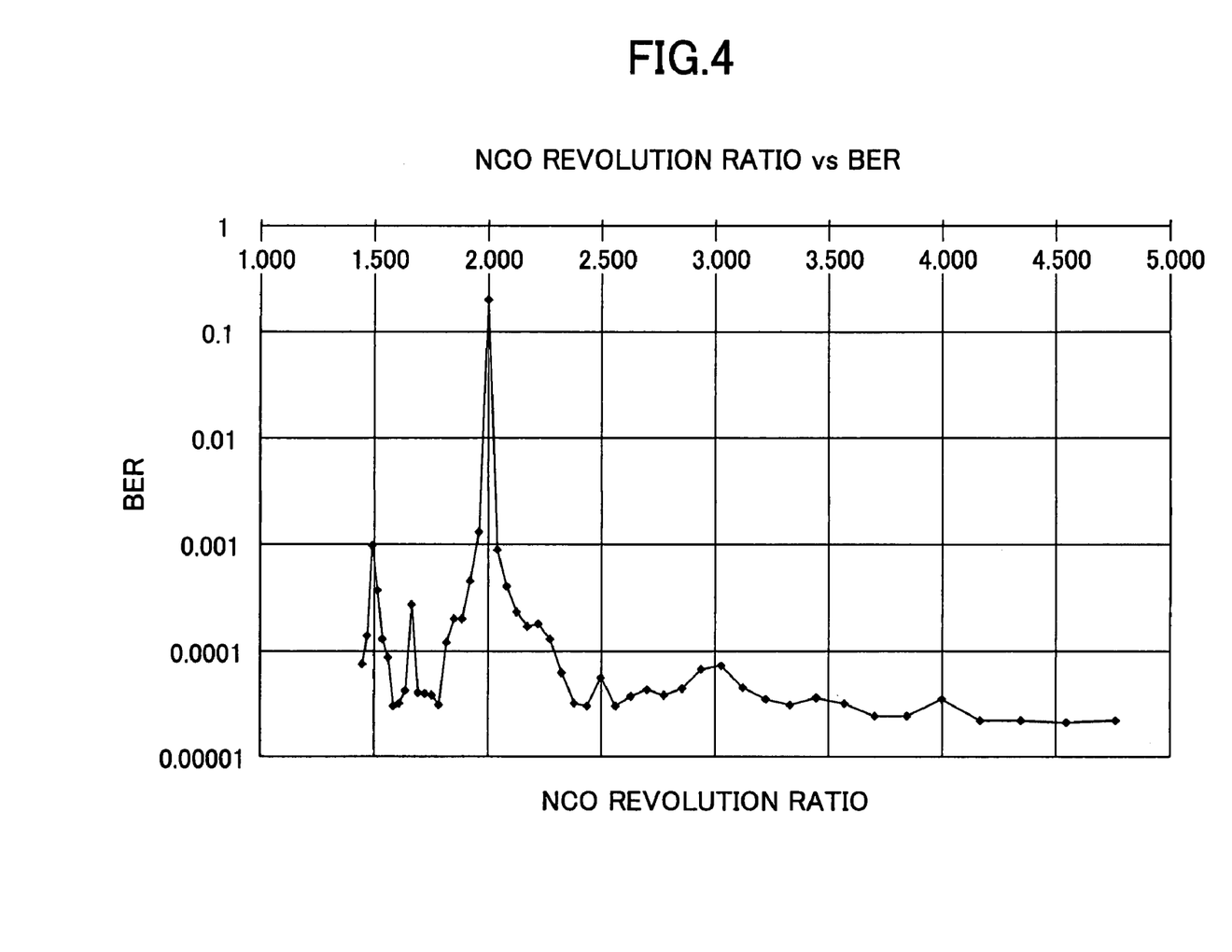
FIG. 4 is a drawing showing the relationship between decimation rates and error rates obtained by simulation.

FIG. 4 is a drawing showing the relationship between decimation rates and error rates obtained by simulation. In FIG. 4, the vertical axis represents BER (bit error rate), and the horizontal axis represents the ratio of NCO revolution. Here, a NCO revolution ratio of 2.000 corresponds to a decimation rate of ½. The NCO revolution ratio and the decimation rate are in a reciprocal relationship.

As shown in FIG. 4, degradation in the performance is significant around an NCO revolution ratio of 2 (decimation rate of ½). Further, degradation in the performance increases at the points where the decimation rate is a reciprocal of an integer number such as the points corresponding to an NCO revolution ratio of 3 and 4 (decimation rate of ⅓ and ¼). As the NCO revolution ratio increases from 3, to 4, 5, and so on, a ratio of the number of decimated samples to the total number of sample points decreases. As a result, the effect on the BER performance of the fluctuating decimation timing caused by the fluctuation in the sawtooth waveform decreases.

As a method for avoiding the problem of performance degradation occurring with a decimation rate equal to a reciprocal of an integer number, a plurality of sampling clock may be provided, and are used selectively depending on the symbol rate, thereby avoiding a situation where the decimation ratio becomes a reciprocal of an integer number.

Such a configuration using a plurality of clocks, however, gives rise to a problem that the circuit becomes complex and the circuit size increases. Further, it is difficult to switch clocks seamlessly, thereby giving rise to a problem that the symbol rate cannot be easily changed.

Accordingly, there is a need for a timing recovery circuit and a decimated clock generating method that can prevent the performance degradation associated with the decimation of a clock signal.

SUMMARY OF THE INVENTION

It is a general object of the present invention to provide a timing recovery circuit and decimated clock generating method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a timing recovery circuit and decimated clock generating method particularly pointed out in the specification in such full, clear, concise, and exact terms as to enable a person having ordinary skill in the art to practice the invention.

To achieve these and other advantages in accordance with the purpose of the invention, the invention provides a timing recovery circuit, which includes a first oscillating circuit configured to produce a first timing signal at an output node, a second oscillating circuit configured to produce a second timing signal at an output node, a first decimation circuit coupled to a supply node of a first clock signal and to the output node of the first oscillating circuit to produce at an output node a second clock signal made by decimating pulses of the first clock signal in response to the first timing signal, and a second decimation circuit coupled to the output node of the first decimation circuit and to the output node of the second oscillating circuit to produce a third clock signal made by decimating pulses of the second clock signal in response to the second timing signal, wherein one of the first timing signal and the second timing signal has a fixed cycle, and another one of the first timing signal and the second timing signal has a cycle responsive to feedback control.

According to another aspect of the present invention, a method of generating a decimated clock is provided in a timing recovery circuit which generates a second clock signal made by decimating pulses of a first clock signal in response to feedback control utilizing a phase of an output data signal, and generates the output data signal by adjusting phases of sample points of an input data signal in response to the feedback control and by decimating the sample points in response to the second clock signal. The method includes a first decimation step of generating a intermediate clock signal made by decimating pulses of the first clock signal, and a second decimation step of generating the second clock signal made by decimating pulses of the intermediate clock signal, wherein one of the first decimation step and the second decimation step decimates pulses at intervals responsive to the feedback control, and another one of the first decimation step and the second decimation step decimates pulses at fixed intervals.

According to at least one embodiment of the present invention, the symbol timing recovery circuit divides the decimation of a clock signal into a plurality of decimation stages, so that there are a portion that performs a decimation process utilizing a fixed decimation rate without being affected by jitter, and another portion that performs a decimation process using a feedback-based decimation rate with the effect of jitter being present. These portions are combined together to achieve a desired decimation rate. In this configuration, the decimation process utilizing the fixed decimation rate allows the decimation rate of the feedback-based decimation process to be lowered. Accordingly, the effect of jitter on the feedback-based decimation process can be reduced.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, embodiments of the present invention will be described with reference to the accompanying drawings.

Figure 5:
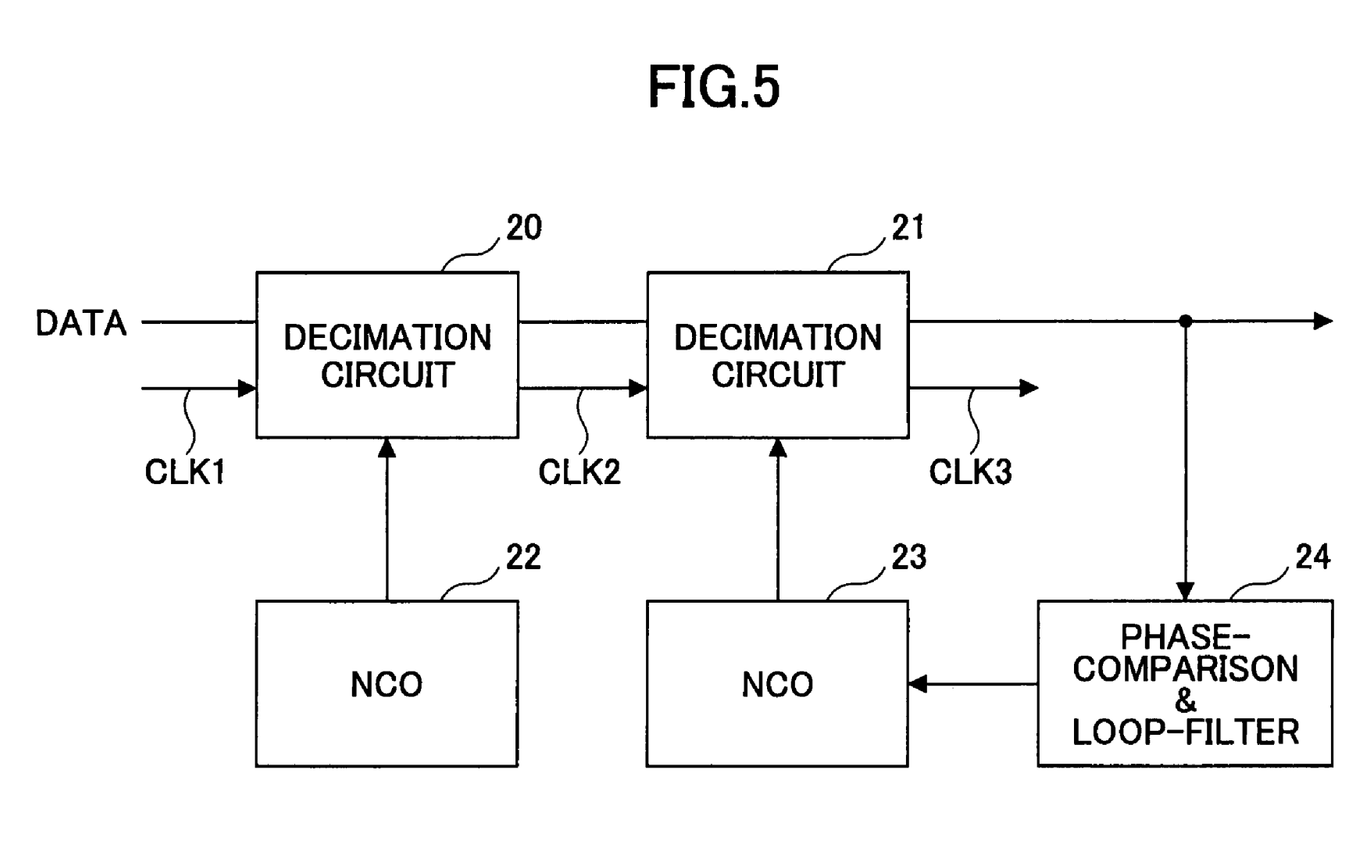
FIG. 5 is a drawing showing a basic configuration of a symbol timing recovery circuit according to the present invention.

FIG. 5 is a drawing showing a basic configuration of a symbol timing recovery circuit according to the present invention. The symbol timing recovery circuit of FIG. 5 includes a first decimation circuit 20, a second decimation circuit 21, a first NCO 22, a second NCO 23, and a phase-comparison & loop-filter 24.

Each of the first decimation circuit 20 and the second decimation circuit 21 corresponds to a portion including the clock control circuit 10, the digital filter 13, the flip-flop 12, and the tap coefficient computing unit 17 shown in FIG. 1. Each of the first decimation circuit 20 and the second decimation circuit 21 adjusts the timing of incoming received data by a filtering process or the like, and decimates the sample points, thereby producing timing-adjusted, decimated received data. Further, each of the first decimation circuit 20 and the second decimation circuit 21 decimates a clock signal input thereto so as to produce a decimated clock signal.

The filtering process and decimation process of the first decimation circuit 20 is controlled by the output signal of the first NCO 22. The filtering process and decimation process of the second decimation circuit 21 is controlled by the output signal of the second NCO 23.

The first NCO 22 oscillates at a fixed oscillating frequency to produce a sawtooth signal having a predetermined cycle. The output of the first NCO 22 is fixed to the predetermined frequency, and is thus highly precise without being affected by jitter.

The second NCO 23 produces a sawtooth signal based on the feedback control similar to that described in connection with FIG. 1. Namely, this feedback control is performed such that the data signal output from the second decimation circuit 21 coincides with data identifying points and zero-crossing points. Specifically, the phase-comparison & loop-filter 24 uses its phase comparison function to detect a phase difference between the data output of the flip-flop 12 and the zero-crossing points or data identifying points, and uses its loop-filter function to integrate the phase difference. The second NCO 23 oscillates at the frequency responsive to the value indicated by the output of the phase-comparison & loop-filter 24.

Accordingly, the output of the second decimation circuit 21 becomes the received data that is sampled at twice the symbol rate, i.e., the data in which the values of the data identifying points and zero-crossing points of the received signal alternately appear.

In the configuration of FIG. 5, the first decimation circuit 20 first decimates a clock signal CLK1 with accurate decimation timing to produce a clock signal CLK2, and, then, the second decimation circuit 21 decimates the clock signal CLK2 at the decimation rate responsive to a deviation from the symbol rate, thereby producing a clock signal CLK3. The decimation rate at the first stage from the clock signal CLK1 to the clock signal CLK2 is selected such that the decimation rate at the second stage from the clock signal CLK2 to the clock signal CLK3 is not set to a rate such as ½ or ⅓ that creates a great jitter effect.

In this manner, the symbol timing recovery circuit according to the present invention divides the decimation of a clock signal into a plurality of decimation stages, so that there are a portion that performs a decimation process utilizing a fixed decimation rate without being affected by jitter, and another portion that performs a decimation process using a feedback-based decimation rate with the effect of jitter being present. These portions are combined together to achieve a desired decimation rate. In this configuration, the decimation process utilizing the fixed decimation rate allows the decimation rate of the feedback-based decimation process to be lowered. Accordingly, the effect of jitter on the feedback-based decimation process can be reduced.

Figure 6:
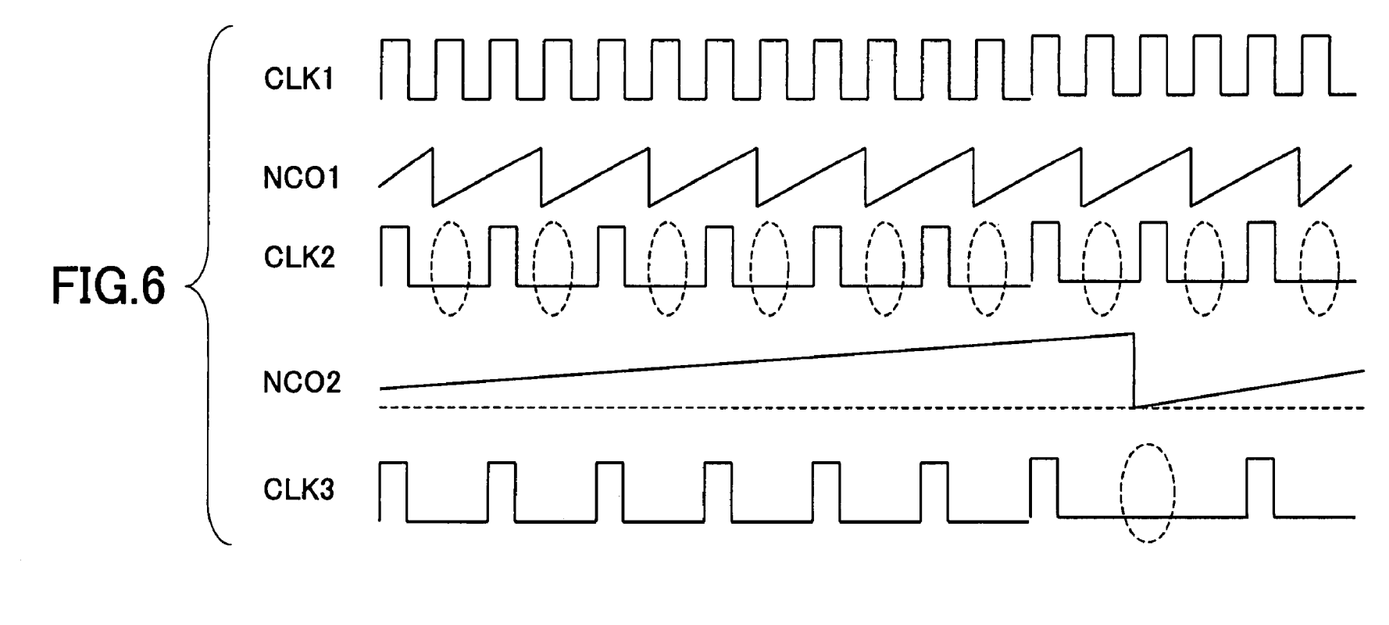
FIG. 6 is a drawing showing an example of the decimation of a clock signal by the circuit of FIG. 5.

FIG. 6 is a drawing showing an example of the decimation of a clock signal by the circuit of FIG. 5. In the example of FIG. 6, a sawtooth signal NCO1 having a fixed cycle is used to decimate the clock signal CLK1 to produce the clock signal CLK2. This decimation process corresponds to the decimation by the first decimation circuit 20 shown in FIG. 5. The sawtooth signal NCO1 is free from the effect of jitter and oscillates with the fixed cycle, so that the clock signal CLK2 has clock pulses evenly distributed.

After this, a sawtooth signal NCO2 having a feedback-control-dependent cycle is used to decimate the clock signal CLK2 so as to produce the clock signal CLK3. This decimation process corresponds to the decimation by the second decimation circuit 21 shown in FIG. 5. The sawtooth signal NCO2 has the cycle thereof fluctuating due to the effect of jitter. Since the decimation frequency from the clock signal CLK2 to the clock signal CLK3 is low, the misalignment of decimation position has only a small effect on the quality of the received signal.

Figure 7:
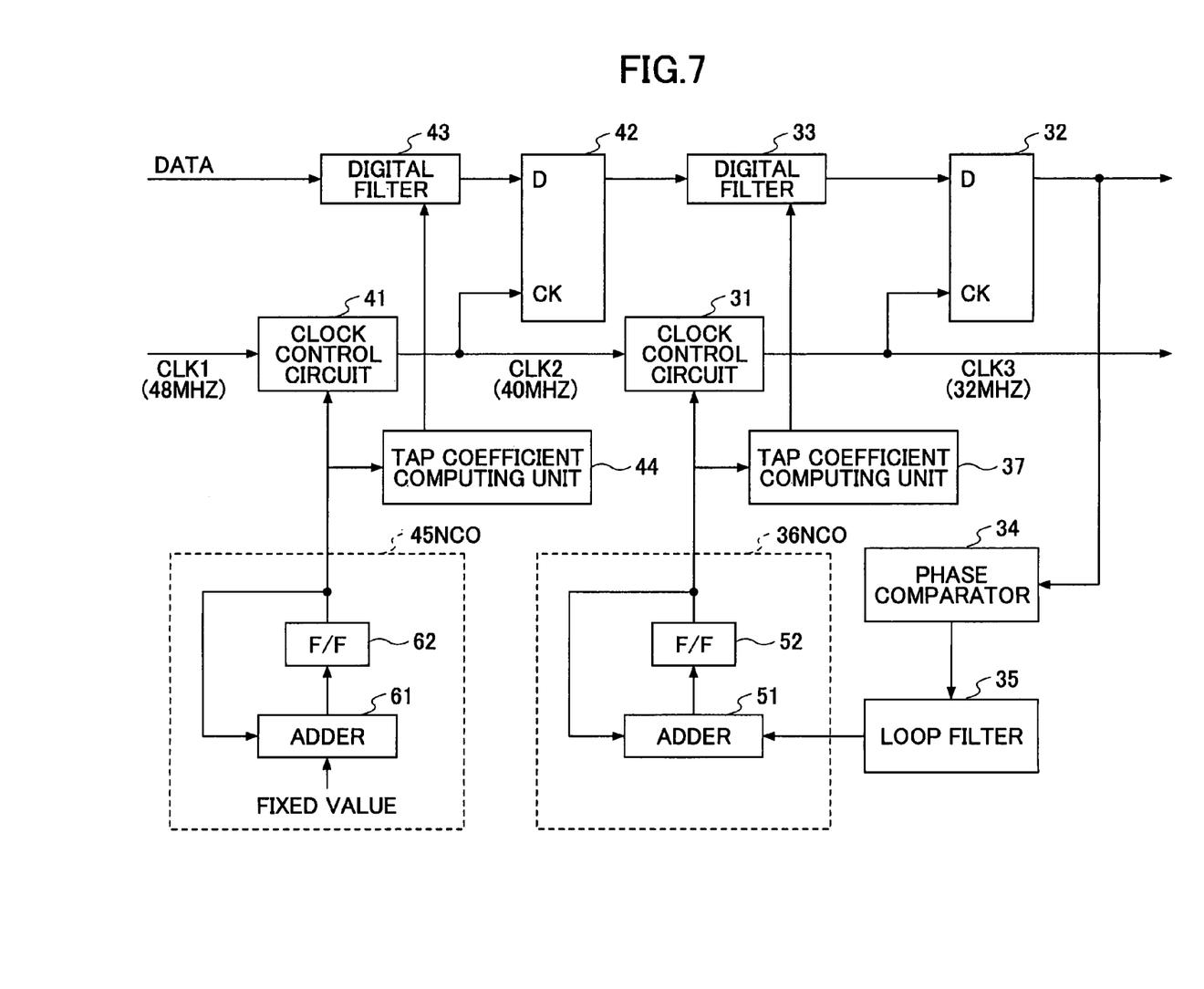
FIG. 7 is a drawing showing the configuration of a first embodiment of the symbol timing recovery circuit according to the present invention.

FIG. 7 is a drawing showing the configuration of a first embodiment of the symbol timing recovery circuit according to the present invention. The symbol timing recovery circuit of FIG. 7 includes a clock control circuit 31, a flip-flop 32, a digital filter 33, a phase comparator 34, a loop filter 35, an NCO 36, a tap coefficient computing unit 37, a clock control circuit 41, a flip-flop 42, a digital filter 43, a tap coefficient computing unit 44, and an NCO 45.

The clock control circuit 31, the flip-flop 32, the digital filter 33, and the tap coefficient computing unit 37 correspond to the second decimation circuit 21 of FIG. 5. The phase comparator 34 and the loop filter 35 correspond to the phase-comparison & loop-filter 24 of FIG. 5. The NCO 36 corresponds to the second NCO 23 of FIG. 5. The clock control circuit 41, the flip-flop 42, the digital filter 43, and the tap coefficient computing unit 44 correspond to the first decimation circuit 20 of FIG. 5. The NCO 45 corresponds to the first NCO 22 of FIG. 5. The operation of the two-stage decimation process is the same as what was described in connection with FIG. 5.

The digital filter 43 delays received data DATA in response to the tap coefficient provided therein, thereby producing delayed received data. The flip-flop 42 latches the delayed received data by use of the clock signal CLK2, and outputs the latched data. The clock signal CLK2 is made by decimating the clock signal CLK1 with a fixed decimation rate by use of the clock control circuit 41. This generates the received data for which the number of samples is decimated to a rate close to the desired sampling rate (i.e., twice the symbol rate), and generates the clock signal CLK2 having the frequency close to the desired sampling frequency.

The decimation process by the clock control circuit 41 and the filtering process by the digital filter 43 are controlled by the NCO 45. The NCO 45 oscillates with the fixed cycle to produce a sawtooth waveform. In response to the signal value of this sawtooth waveform, the tap coefficient computing unit 44 computes filter coefficients for provision to the digital filter 43. Further, the clock control circuit 41 detects a falling edge (i.e., a return of the signal value to its initial value) of the sawtooth waveform output from the NCO 45, and decimates (discards) a clock pulse at the same timing as the detection, thereby achieving a desired decimation process.

The NCO 45 includes an adder 61 and a flip-flop 62 for multi-bit data. The adder 61 adds a fixed value to the output of the flip-flop 62, and supplies the sum to the flip-flop 62. The flip-flop 62 latches the supplied sum in synchronization with a predetermined clock. With this provision, an output that has the value thereof increasing cumulatively in synchronization with the predetermined clock is obtained. An increase for one step is equal to the fixed value that is input into the adder 61. Provision is further made such that the output of the flip-flop 62 is reset upon reaching the maximum value and returns to zero.

The digital filter 33 delays the output of the flip-flop 42 in response to the tap coefficients provided therein, thereby generating delayed received data. The flip-flop 32 latches the delayed received data by use of the clock signal CLK3, and outputs the latched data. The clock signal CLK3 is obtained by decimating the clock pulses of the clock signal CLK2 by use of the clock control circuit 31. Here, the control is such that the frequency after the decimation is equal to twice the symbol rate of the received data DATA. With this provision, the received data that is sampled at twice the symbol rate is obtained. Such received data is comprised of the data identifying points and zero-crossing points of the received signal appearing alternately.

The decimation by the clock control circuit 31 and the filtering process by the digital filter 33 are controlled based on the feedback control using the output of the flip-flop 32. This feedback control is performed such that the output of the flip-flop 32 resulting from the filtering process by the digital filter 33 coincide with the data identifying points or zero-crossing points. Specifically, the phase comparator 34 uses, among the output data of the flip-flop 32, the value of the data supposed to be at a zero-crossing point and the values of the data supposed to be at the preceding and following data identifying points, and computes a deviation from the conditions that are supposed to be satisfied by the values of the zero-crossing points and the values of the data identifying points. This computed value represents a phase difference between the output of the flip-flop 32 and the zero-crossing points or data identifying points.

The value indicative of a phase difference that is output from the phase comparator 34 is integrated by the loop filter 35. The NCO 36 oscillates at the frequency responsive to the value indicated by the output of the loop filter 35. For example, the larger the output of the loop filter 35, the higher the oscillating frequency of the NCO 36 is. The smaller the output of the loop filter 35, the lower the oscillating frequency of the NCO 36 is. The oscillating signal of the NCO 36 has a sawtooth waveform. In response to the signal value of this sawtooth waveform, the tap coefficient computing unit 37 computes filter coefficients for provision to the digital filter 33. Further, the clock control circuit 31 detects a falling edge (i.e., a return of the signal value to its initial value) of the sawtooth waveform output from the NCO 36, and decimates (discards) a clock pulse at the same timing as the detection, thereby achieving a desired decimation process.

The NCO 36 includes an adder 51 and a flip-flop 52 for multi-bit data. The adder 51 obtains a sum of a fixed value, the output of the loop filter 35, and the output of the flip-flop 52, and supplies the sum to the flip-flop 52. The flip-flop 52 latches the supplied sum in synchronization with a predetermined clock. With this provision, an output that has the value thereof increasing cumulatively in synchronization with the predetermined clock is obtained. An increase for one step is equal to the fixed base value plus the output of the loop filter 35 that is input into the adder 51. Provision is further made such that the output of the flip-flop 52 is reset upon reaching the maximum value and returns to zero.

Figure 8:
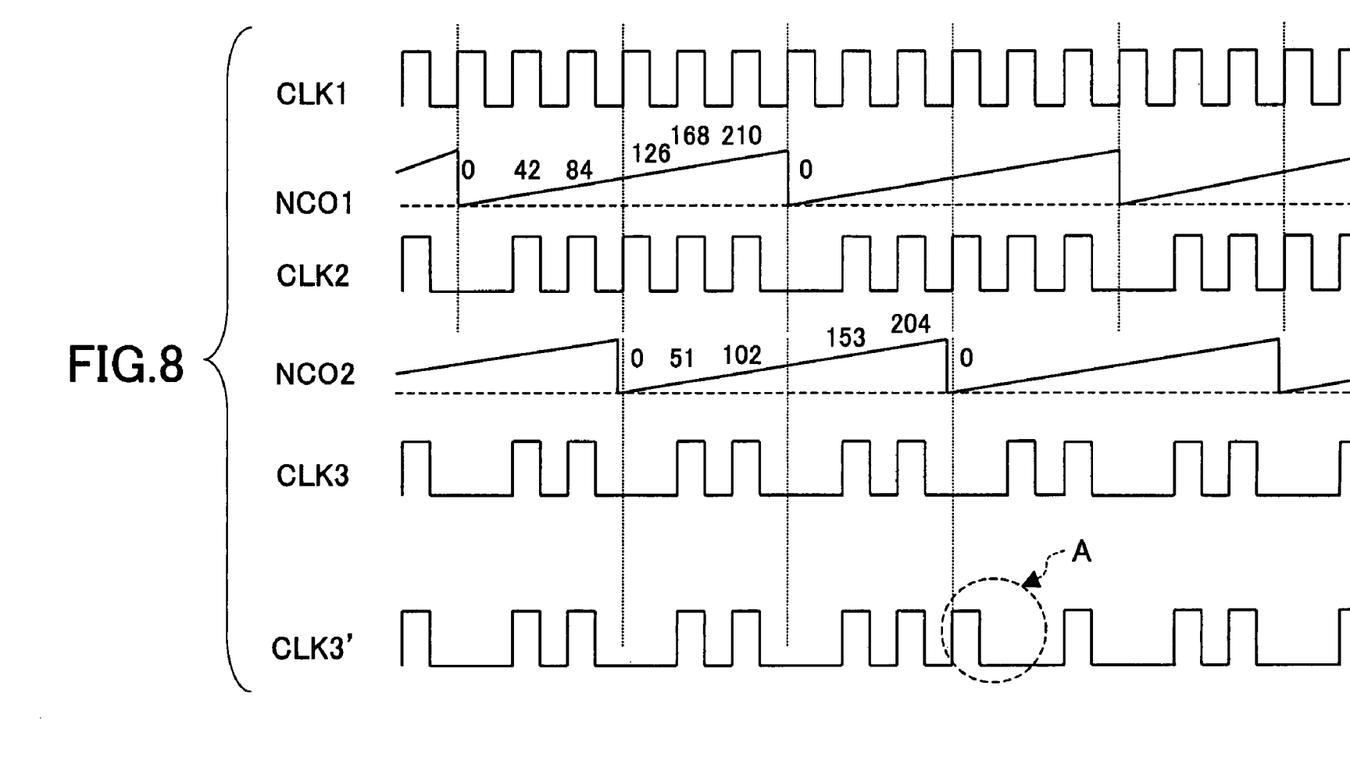
FIG. 8 is a waveform diagram showing the decimation process from a clock signal CLK1 to a clock signal CLK2 and the decimation process from a clock signal CLK2 to a clock signal CLK3.

In the following, a description of the decimation process of the present invention will be described with reference to an example in which the symbol timing recovery circuit shown in FIG. 7 generates a 40-MHz clock signal CLK2 from a 48-MHz clock signal CLK1, and further generates a 32-MHz clock signal CLK3 from the 40-MHz clock signal CLK2. FIG. 8 is a waveform diagram showing the decimation process from the clock signal CLK1 to the clock signal CLK2 and the decimation process from the clock signal CLK2 to the clock signal CLK3.

In this example, it is assumed that the outputs of the NCO 36 and the NCO 45 are 8-bit data. In order to generate the 40-MHz clock signal CLK2 from the 48-MHz clock signal CLK1 and further generate the 32-MHz clock signal CLK3 from the 40-MHz clock signal CLK2, the first stage performs decimation with a decimation rate of 1/6, and the second stage performs decimation with a decimation rate of 1/5.

In order to achieve a decimation rate of 1/6 in the NCO 45, the fixed value input into the adder 61 shown in FIG. 7 is set to 42 (nearly equal to 256 steps (8 bit) divided by 6). As the flip-flop 62 shown in FIG. 7 performs latch operations in synchronization with the clock signal CLK1, a sawtooth waveform is obtained that increases from 0 to 256 (to be exact, this number is 252=42×6) in a time period equal to 6 cycles of the clock signal CLK1. This waveform is illustrated as NCO1 in FIG. 8. Although a decimation rate of 1/6 is a reciprocal of an integer number, the clock signal CLK2 having pulses evenly decimated as shown in FIG. 8 is obtained because the decimation process at the first stage utilizes a fixed-cycle sawtooth waveform free from the effect of jitter.

The NCO 36 is supposed to achieve a decimation rate of 1/5, the base value of the adder 51 shown in FIG. 7 is set to 51 (nearly equal to 256 steps (8 bit) divided by 5). This set value is added to the output of the loop filter 35 serving as a feedback adjustment. Accordingly, an increase for one step when the output of the NCO 36 cumulatively increases is deviated from the base value "51" in response to the feedback adjustment. A sawtooth waveform generated in this manner is illustrated as NCO2 in FIG. 8. This feedback adjustment includes the effect of jitter, so that the timing of a falling edge of NCO2 fluctuates due to the jitter. In the example shown in FIG. 8, however, a decimation rate is as small as 1/5, so that the effect of jitter is not significant.

A signal in which the position of clock pulse decimation is misplaced due to the effect of jitter is illustrated at the bottom of FIG. 8 as a clock signal CLK3'. The portion indicated by an arrow A corresponds to the point where the position of clock pulse decimation is misplaced due to the effect of jitter. Such misplacement can only occur once in every 6 cycles of the clock signal CLK1 at a maximum. In the related-art single-stage decimation configuration, however, a decimation rate of 1/3 is needed to convert the 48-MHz clock signal CLK1 into 32 MHz through decimation. In this case, the misplacement of decimation position due to the effect of jitter occurs once in every 3 cycles of the clock signal CLK1 at a maximum.

In the example described above, a description has been given of the case in which a decimation rate is 1/6 at the first stage and 1/5 at the second stage for the purpose of simplicity of explanation. The decimation rate of the second stage may be set to a smaller value such as 1/8 having less frequency of occurrence, for example. Such setting provides more stable performance than that of the above-described example. Further, although the above description has been given with reference to the use of 8-bit data for NCOs, the actual data size may be set to 24 bits or around that number in most cases.

In the example shown in FIG. 8, the oscillating waveform NCO1 generated by the NCO 45 and the oscillating waveform NCO2 generated by the NCO 36 are set to the same cycle. It should be noted that the initial values for the oscillations are set to different values, thereby preventing the falling edges of NCO1 and NCO2 from coinciding with each other. If the timing at which NCO1 returns to zero and the timing at which NCO2 returns to zero coincide or come close to each other, the position of a clock pulse decimated at the second stage comes next to the position of the clock pulse decimated at the first stage. In such a case, the clock signal CLK3, which is obtained as a result of the two-stage decimation processes, ends up having an extremely uneven pulse distribution in which consecutive pulses are discarded.

In order to avoid such a situation, it is preferable to make the falling edge timing of NCO 45 of the first stage different from the falling edge timing of NCO 36 of the second stage, as shown in the example illustrated in FIG. 8. In order to achieve this, NCO 45 may start operation from an initial value of 0, and NCO 36 may start operation from around an initial value of 100, for example. With such different settings of the initial values of the NCOs, it is possible to obtain a clock signal having an even pulse distribution. In the case where the cycle of the first-stage NCO differs from the cycle of the second-stage NCO, consecutive decimations occur at the timing corresponding to the least common multiple of these cycles. Since the frequency of occurrence is extremely low for such consecutive decimations, however, this is not a significant problem.

Figure 9:
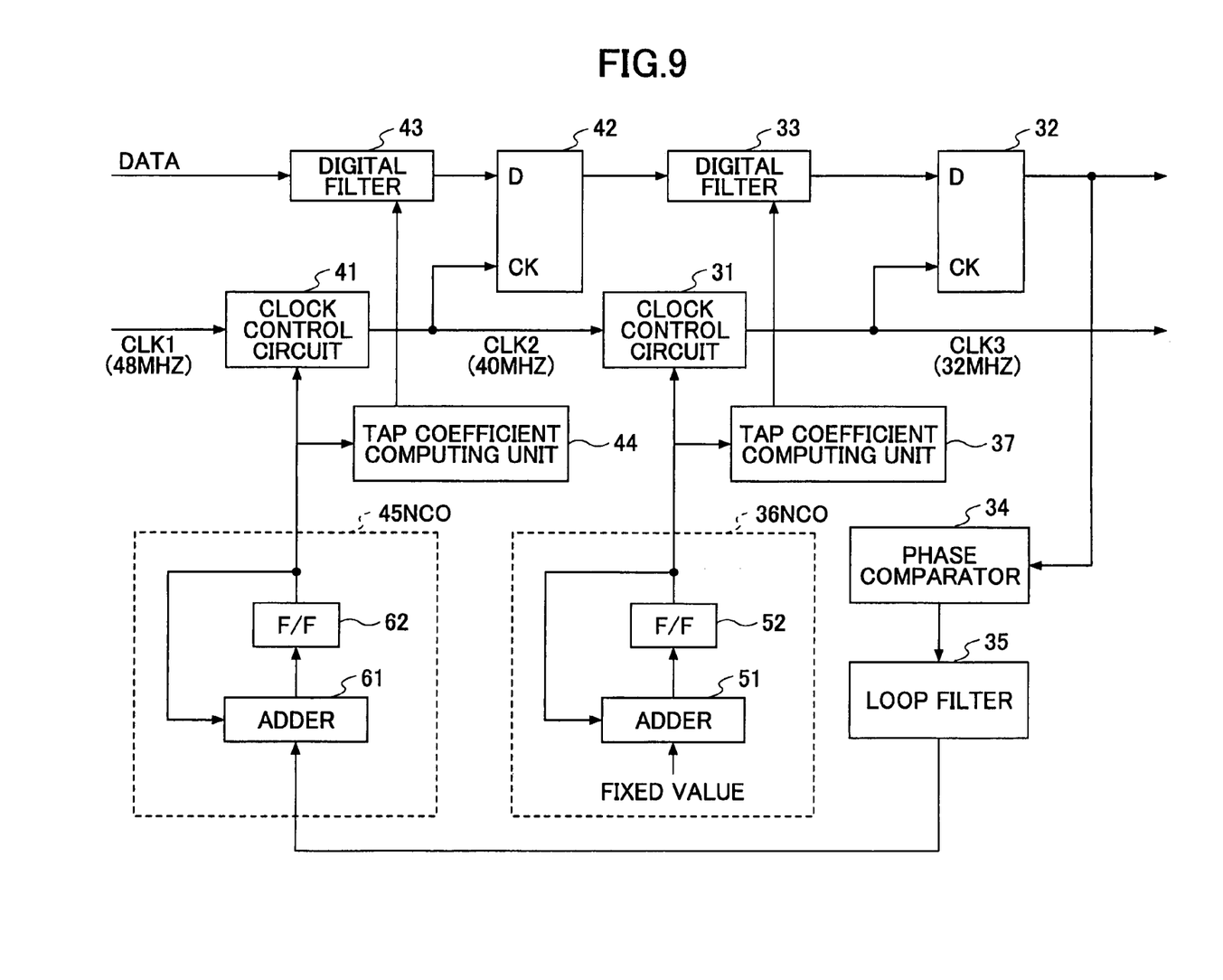
FIG. 9 is a drawing showing the configuration of a second embodiment of the symbol timing recovery circuit according to the present invention.

FIG. 9 is a drawing showing the configuration of a second embodiment of the symbol timing recovery circuit according to the present invention. In FIG. 9, the same elements as those of FIG. 7 are referred to by the same numerals, and a description thereof will be omitted.

In the symbol timing recovery circuit shown in FIG. 9, the role of the first-stage decimation process and the role of the second-stage decimation process are reversed, compared with the symbol timing recovery circuit shown in FIG. 7. In the configuration shown in FIG. 7, the decimation process with a fixed decimation rate is performed at the first stage, and the decimation process with a feedback-control-based decimation rate is performed at the second stage. In the configuration shown in FIG. 9, on the other hand, the decimation process with a feedback-control-based decimation rate is performed at the first stage, and the decimation process with a fixed decimation rate is performed at the second stage. Namely, the output of the loop filter 35 is supplied to the adder 61 of the NCO 45 at the first stage, and the adder 51 of the NCO 36 of the second stage is only provided with a fixed value.

Even in the configuration as shown in FIG. 9, the phase comparator 34, the loop filter 35, the NCO 45, the tap coefficient computing unit 44, the digital filter 43, the flip-flop 42, the digital filter 33, and the flip-flop 32 together constitute a feedback path, which achieves the feedback control equivalent to that of FIG. 7. Further, the NCO 36, the clock control circuit 31, and the flip-flop 32 provide a decimation process with a fixed decimation rate. This provides the same advantage as that of the configuration shown in FIG. 7. Namely, the effect of jitter is reduced by lowering the decimation rate of the feedback-control-based decimation process.

Further, the present invention is not limited to these embodiments, but various variations and modifications may be made without departing from the scope of the present invention.

What is claimed is:

1. A timing recovery circuit, comprising:
   a first oscillating circuit configured to produce a first timing signal at an output node;
   a second oscillating circuit configured to produce a second timing signal at an output node;
   a first decimation circuit coupled to a supply node of a first clock signal and to the output node of said first oscillating circuit to produce at an output node a second clock signal made by decimating pulses of the first clock signal in response to the first timing signal; and
   a second decimation circuit coupled to the output node of said first decimation circuit and to the output node of said second oscillating circuit to produce a third clock signal made by decimating pulses of the second clock signal in response to the second timing signal, wherein one of the first timing signal and the second timing signal has a fixed cycle, and another one of the first timing signal and the second timing signal has a cycle responsive to feedback control.

2. The timing recovery circuit as claimed in claim 1, wherein said first decimation circuit is further coupled to a supply node of a first data signal to convert the first data signal into a second data signal synchronized with the second clock signal, and said second decimation circuit converts the second data signal into a third data signal synchronized with the third clock signal to output the third data signal at an output node.

3. The timing recovery circuit as claimed in claim 2, further comprising:
   a phase detection circuit coupled to the output node of said second decimation circuit to output a phase detection signal responsive to a phase of the third data signal; and
   a loop filter coupled to said phase detection circuit to receive the phase detection signal,
   wherein only one of said first oscillating circuit and said second oscillating circuit is coupled to an output of said loop filter.

4. The timing recovery circuit as claimed in claim 3, wherein said first decimation circuit includes:
   a circuit configured to adjust a phase of the first data signal; and
   a circuit configured to generate the second data signal by latching the phase-adjusted first data signal in synchronization with the second clock signal,
   and wherein said second decimation circuit includes:
   a circuit configured to adjust a phase of the second data signal; and
   a circuit configured to generate the third data signal by latching the phase-adjusted second data signal in synchronization with the third clock signal.

5. The timing recovery circuit as claimed in claim 4, wherein said circuit configured to adjust a phase of the first data signal adjusts the phase of the first data signal in response to the first timing signal, and said circuit configured to adjust a phase of the second data signal adjusts the phase of the second data signal in response to the second timing signal.

6. The timing recovery circuit as claimed in claim 5, wherein said circuit configured to adjust a phase of the first data signal and said circuit configured to adjust a phase of the second data signal include a digital filter.

7. The timing recovery circuit as claimed in claim 1, wherein said first oscillating circuit and said second oscillating circuit include a numerical control oscillator.

8. The timing recovery circuit as claimed in claim 1, wherein said first oscillating circuit and said second oscillating circuit start oscillating from respective, different initial values.

9. A method of generating a decimated clock in a timing recovery circuit which generates a second clock signal made by decimating pulses of a first clock signal in response to feedback control utilizing a phase of an output data signal, and generates the output data signal by adjusting phases of sample points of an input data signal in response to the feedback control and by decimating the sample points in response to the second clock signal, comprising:
   a first decimation step of generating a intermediate clock signal made by decimating pulses of the first clock signal; and
   a second decimation step of generating the second clock signal made by decimating pulses of the intermediate clock signal,
   wherein one of said first decimation step and said second decimation step decimates pulses at intervals responsive to the feedback control, and another one of said first decimation step and said second decimation step decimates pulses at fixed intervals.

10. The method as claimed in claim 9, wherein said first decimation step generates an intermediate data signal made by adjusting the phases of the sample points of the input data signal and by decimating the sample points in response to the intermediate clock signal, and said second decimation step generates the output data signal made by adjusting phases of sample points of the intermediate data signal and by decimating the sample points of the intermediate data signal in response to the second clock signal.

* * * * *